United States Patent
Forcier (10) Patent No.: US 9,376,215 B2
(45) Date of Patent: Jun. 28, 2016

(54) COWL WITH PRESSURE DRIVEN LATCH

(71) Applicant: United Technologies Corporation, Hartford, CT (US)

(72) Inventor: Matthew J. Forcier, Rocky Hill, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/764,375

(22) PCT Filed: Jan. 29, 2013

(86) PCT No.: PCT/US2013/023649
§ 371 (c)(1),
(2) Date: Jul. 29, 2015

(87) PCT Pub. No.: WO2014/120126
PCT Pub. Date: Aug. 7, 2014

(65) Prior Publication Data
US 2015/0367949 A1    Dec. 24, 2015

(51) Int. Cl.
*B64D 29/06* (2006.01)
*B64D 29/00* (2006.01)
*B64C 7/02* (2006.01)
*F02C 7/20* (2006.01)

(52) U.S. Cl.
CPC . *B64D 29/06* (2013.01); *B64C 7/02* (2013.01); *B64D 29/00* (2013.01); *F02C 7/20* (2013.01)

(58) Field of Classification Search
CPC .......... B64D 29/06; B64D 29/00; F02C 7/20; B64C 7/02
USPC ................................ 60/796, 797, 798; 244/54
See application file for complete search history.

(56) References Cited

U.S. PATENT DOCUMENTS

| | | |
|---|---|---|
| 255,307 A | 3/1882 | Maxim |
| 2,550,337 A | 2/1945 | Duffendack, Jr. et al. |
| 2,832,446 A | 4/1958 | Smith et al. |
| 2,879,959 A | 3/1959 | Morrison et al. |
| 3,194,595 A | 7/1965 | Wheeler et al. |
| 3,347,578 A | 10/1967 | Sheehan et al. |
| 4,044,973 A | 8/1977 | Moorehead |
| 4,220,364 A | 9/1980 | Poe |
| 4,549,708 A | 10/1985 | Norris |
| 4,679,750 A | 7/1987 | Burhans |
| 4,825,644 A | 5/1989 | Bubello et al. |
| 4,858,970 A | 8/1989 | Tedesco et al. |
| 4,920,744 A | 5/1990 | Garcia et al. |
| 5,068,946 A | 12/1991 | Marescot et al. |

(Continued)

OTHER PUBLICATIONS

International Search Report and Written Opinion from PCT Application Serial No. PCT/US2013/023649, dated Sep. 27, 2013, 7 pages.

*Primary Examiner* — Steven Sutherland
(74) *Attorney, Agent, or Firm* — Kinney & Lange, P.A.

(57) ABSTRACT

A gas turbine engine includes an engine core, a core cowl extending circumferentially around the engine core, and a pressure actuated latch assembly. The core cowl includes a first cowl section on a first side of the engine core and a second cowl section on a second side of the engine core. The pressure actuated latch assembly connects the first cowl section to a support structure and is actuatable between an unlatched position when pressure within the core cowl is relatively low and a latched position when pressure within the core cowl is relatively high.

20 Claims, 5 Drawing Sheets

(56) References Cited

U.S. PATENT DOCUMENTS

| | | |
|---|---|---|
| 5,076,514 A | 12/1991 | Melcher |
| 5,303,508 A | 4/1994 | Porte |
| 5,350,136 A | 9/1994 | Prosser et al. |
| 5,915,765 A | 6/1999 | Sternberger |
| 6,032,901 A | 3/2000 | Carimali et al. |
| 6,189,832 B1 | 2/2001 | Jackson |
| 6,334,730 B1 | 1/2002 | Porte |
| 6,343,815 B1 | 2/2002 | Poe |
| 6,629,712 B2 | 10/2003 | Jackson et al. |
| 7,040,578 B2 | 5/2006 | Halin |
| 7,703,716 B2 | 4/2010 | Bulin |
| 7,938,366 B2 | 5/2011 | Martinez Rueda et al. |
| 7,994,940 B2 | 8/2011 | Grichener et al. |
| 2011/0297787 A1 | 12/2011 | Guillaume et al. |
| 2012/0125010 A1 | 5/2012 | Michael et al. |

# COWL WITH PRESSURE DRIVEN LATCH

BACKGROUND

The present invention relates to gas turbine engines, and in particular, to cowl for use in gas turbine engines. Gas turbine engines typically include a compressor section, a combustor section, and a turbine section. During operation, such engines have high pressure gas in each of these sections. Some gas turbine engines include one or more other components that contain high pressure gas, such as flow passages for a bleed system. Some bleed systems, for example, have passages connected to the compressor section to transport compressed gas from the compressor to one or more systems or components that use compressed gas. For example, in some applications bleed air is used by turbine blades that are cooled and/or a cabin air conditioning and temperature control system on an aircraft.

Some gas turbine engines, such as propulsion gas turbine engines, include one or more cowls. For example, a core cowl can be used to cover an engine core (including the compressor section, the combustor section, and the turbine section). Typically, air pressure within the core cowl is relatively low. However, if a portion of the gas turbine engine containing high pressure gas within the core cowl has a leak, the pressure within the core cowl can rapidly increase and cause the core cowl to burst.

SUMMARY

According to the present invention, a gas turbine engine includes an engine core, a core cowl extending circumferentially around the engine core, and a pressure actuated latch assembly. The core cowl includes a first cowl section on a first side of the engine core and a second cowl section on a second side of the engine core. The pressure actuated latch assembly connects the first cowl section to a support structure and is actuatable between an unlatched position when pressure within the core cowl is relatively low and a latched position when pressure within the core cowl is relatively high.

A core cowl for use with an engine core of a gas turbine engine includes a first cowl section for covering a first side of an engine core and a second cowl section for covering a second side of the engine core. A pressure actuated latch assembly connects the first cowl section to the second cowl section for latching the first cowl section to the second cowl section when pressure within the core cowl is relatively high.

DETAILED DESCRIPTION

Figure 1:
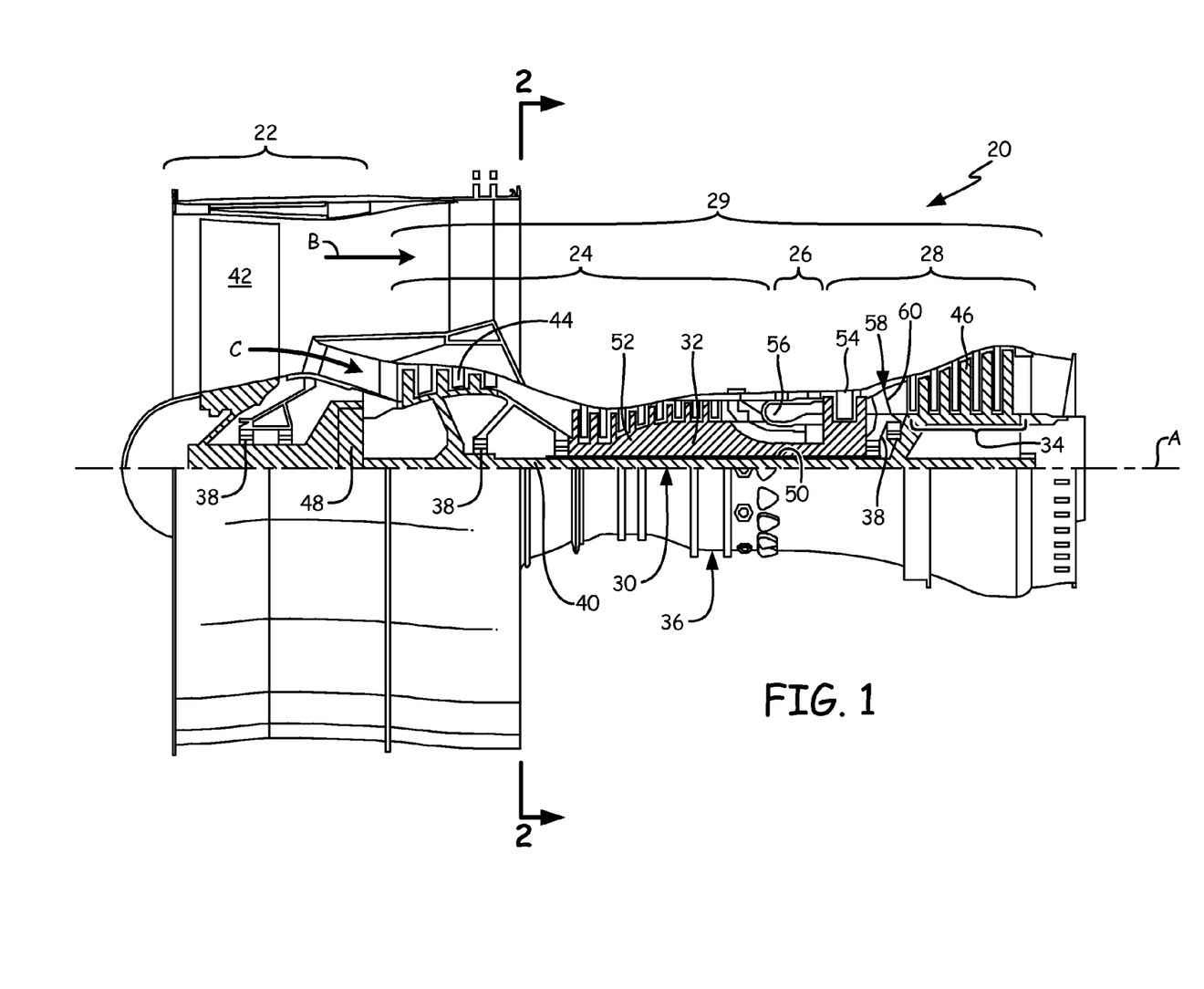
FIG. 1 is a schematic side sectional view of a gas turbine engine with a nacelle and core cowl removed.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24. Compressor section 24, combustor section 26, and turbine section 28 combine to form engine core 29.

Although the disclosed non-limiting embodiment depicts one gas turbine engine, it should be understood that the concepts described herein are not limited to use with the illustrated gas turbine engine as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52, mixed with fuel and ignited in combustor 56 to produce high speed exhaust gases that are then expanded through high pressure turbine 54 and low pressure turbine 46. Mid-turbine frame 58 includes vanes 60, which are in the core airflow path and function as an inlet guide vane for low pressure turbine 46. Utilizing vane 60 of mid-turbine frame 58 as the inlet guide vane for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7]^{0.5}$. The "Low corrected fan tip speed", as disclosed herein according to one non-limiting embodiment, is less than about 1150 ft/second.

The example gas turbine engine includes fan 42 that comprises in one non-limiting embodiment less than about twenty-six (26) fan blades. In another non-limiting embodiment, fan section 22 includes less than about twenty (20) fan blades. Moreover, in one disclosed embodiment low pressure turbine 46 includes no more than about six (6) turbine rotors schematically indicated at 34. In another non-limiting example embodiment low pressure turbine 46 includes about three (3) turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Gas turbine engine 20 can include a nacelle (shown in FIG. 2), which has been opened and removed from FIG. 1 for clarity. Gas turbine engine 20 can include a number of other components, such as a bleed system having bleed air passages (not shown), which have also been omitted from FIG. 1 for clarity.

Figure 2:
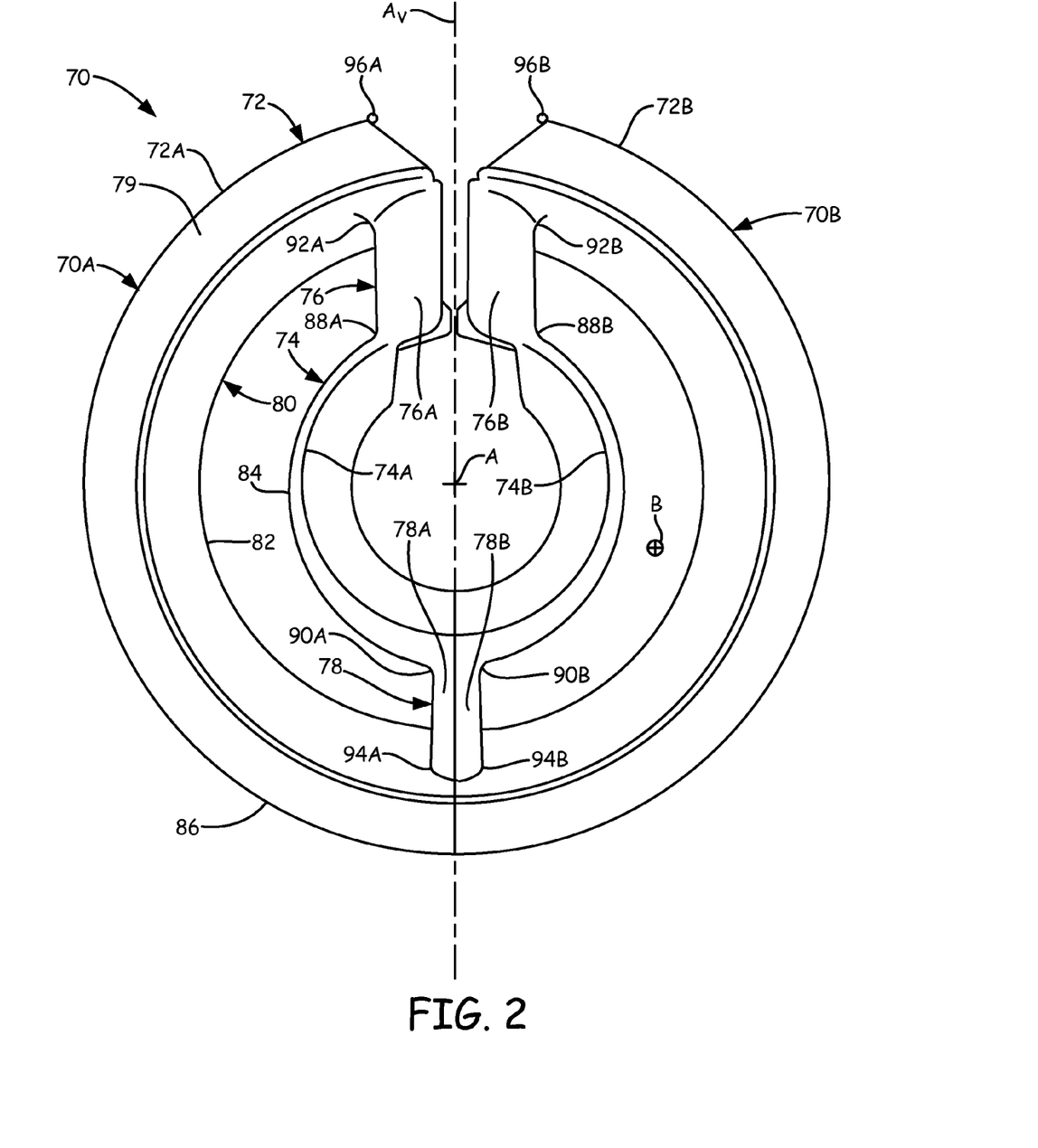
FIG. 2 is a schematic front sectional view of the nacelle of the gas turbine engine taken along line 2-2 of FIG. 1.

FIG. 2 is a schematic front sectional view of nacelle 70 of gas turbine engine 20 (shown in FIG. 1) taken along line 2-2 of FIG. 1. Nacelle 70 includes outer cowl 72, core cowl 74, upper bifurcation structure 76, and lower bifurcation structure 78. Outer cowl 72 can include multiple sections, including a fan cowl section (not shown) and translating cowl section 79 positioned downstream of the fan cowl section. The fan cowl section, which is positioned radially outward of and covers fan section 22 and fan 42 (both shown in FIG. 1), is not shown in FIG. 2 because it is positioned axially forward of section line 2-2 of FIG. 1. Translating cowl section 79, which is positioned axially aft of section line 2-2 of FIG. 1, can include thrust reversers (not shown) for reversing thrust of gas turbine engine 20. In alternative embodiments, outer cowl 72 can have an alternative construction without a translating cowl section.

Core cowl 74 is positioned radially inward of outer cowl 72. Core cowl 74 is positioned radially outward of, extends circumferentially around, and covers compressor section 24, combustor section 26, and turbine section 28 (all shown in FIG. 1). Outer cowl 72 and core cowl 74 extend substantially circumferentially with respect to engine central longitudinal axis A. Outer cowl 72 is connected to core cowl 74 via upper bifurcation structure 76 and lower bifurcation structure 78. Upper bifurcation structure 76 and lower bifurcation structure 78 extend substantially radially with respect to engine central longitudinal axis A.

Nacelle 70 defines fan bypass duct 80 between outer cowl 72 and core cowl 74. Fan bypass duct 80 is a substantially annular duct that is bifurcated by upper bifurcation structure 76 and lower bifurcation structure 78. Outer wall 82 of fan bypass duct 80 is defined by outer cowl 72. Inner wall 84 of fan bypass duct 80 is defined by core cowl 74. Fan bypass duct 80 defines bypass flow path B between outer wall 82 and inner wall 84. Outer cowl 72 defines outer surface 86 of nacelle 70.

Nacelle 70 is split down engine vertical axis $A_V$ to divide first nacelle side 70A from second nacelle side 70B. Second nacelle side 70B is opposite of and substantially symmetrical to first nacelle side 70A. First nacelle side 70A includes outer cowl side 72A, core cowl side 74A, upper bifurcation side 76A, and lower bifurcation side 78A. Second nacelle side 70B includes outer cowl side 72B, core cowl side 74B, upper bifurcation side 76B, and lower bifurcation side 78B.

Core cowl side 74A is curved so as to be substantially arc-shaped, extending between upper bifurcation side 76A and lower bifurcation side 78A. Core cowl side 74A connects to upper bifurcation side 76A at core cowl corner 88A. Core cowl side 74A connects to lower bifurcation side 78A at core cowl corner 90A. Outer cowl side 72A connects to upper bifurcation side 76A at outer cowl corner 92A. Outer cowl side 72A connects to lower bifurcation side 78A at outer cowl corner 94A. Upper bifurcation side 76A and lower bifurcation side 78A extend substantially vertically from core cowl corners 88A and 90A, respectively.

Core cowl side 74B is curved so as to be substantially arc-shaped, extending between upper bifurcation side 76B and lower bifurcation side 78B. Core cowl side 74B connects to upper bifurcation side 76B at core cowl corner 88B. Core cowl side 74B connects to lower bifurcation side 78B at core cowl corner 90B. Outer cowl side 72B connects to upper bifurcation side 76B at outer cowl corner 92B. Outer cowl side 72B connects to lower bifurcation side 78B at outer cowl corner 94B. Upper bifurcation side 76B and lower bifurcation side 78B extend substantially vertically from core cowl corners 88B and 90B, respectively.

Nacelle 70 can be opened by pivoting first nacelle side 70A about upper hinge 96A in a first direction and pivoting second nacelle side 70B about upper hinge 96B in a second direction so as to expose gas turbine engine 20. When first and second nacelle sides 70A and 70B are pivoted outward, core cowl sides 74A and 74B pivot outward to expose engine core 29 (shown in FIG. 1). When closed, first and second core cowl sides 74A and 74B cover engine core 29.

During operation, the gas in engine core 29 can have relatively high pressure as compared to the gas between engine core 29 and core cowl 74 and as compared to the gas in fan bypass duct 80. If a portion of engine core 29 were to leak, the pressure within core cowl 74 could rapidly increase and tend to cause core cowl 74 to burst.

Figure 3:
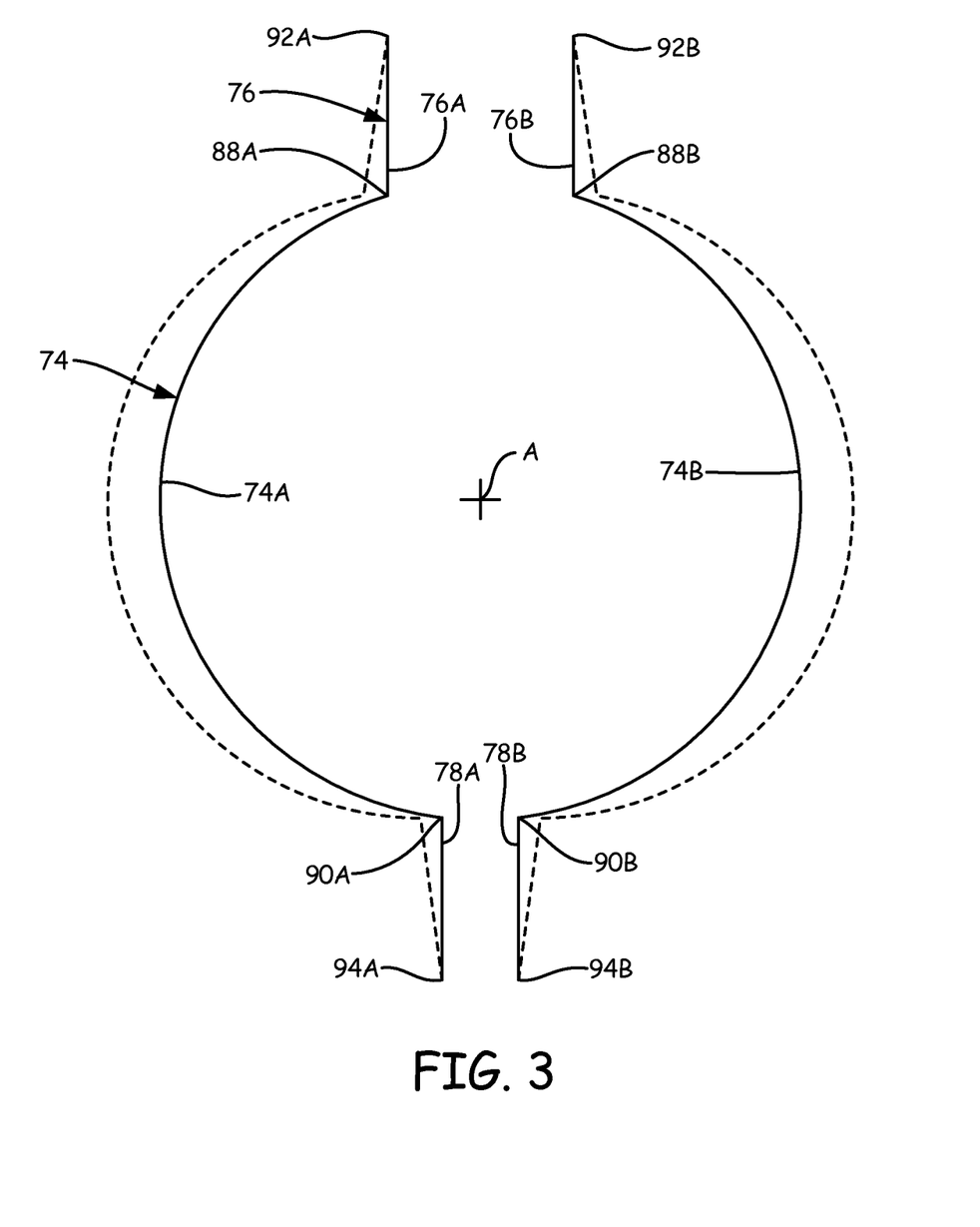
FIG. 3 is a simplified front sectional view of the core cowl of FIG. 2.

FIG. 3 is a simplified front sectional view of core cowl 74. When a high pressure gas leak increases pressure within core cowl 74, that pressure can tend to push core cowl 74 radially outwards. The solid line illustrates core cowl 74 under ordinary operating conditions and the dashed line illustrates a shape that core cowl 74 would tend to take under burst conditions, if not otherwise restrained by a latch (described below, with respect to FIGS. 4 and 5). Because outer cowl corners 92A, 92B, 94A, and 94B are structurally supported by outer cowl 72, outer cowl corners 92A, 92B, 94A, and 94B can remain relatively fixed under burst conditions. Core cowl sides 74A and 74B as well as core cowl corners 88A, 88B, 88C, and 88D can, however, be pushed to deflect radially outwards if not restrained by a latch.

Figure 4:
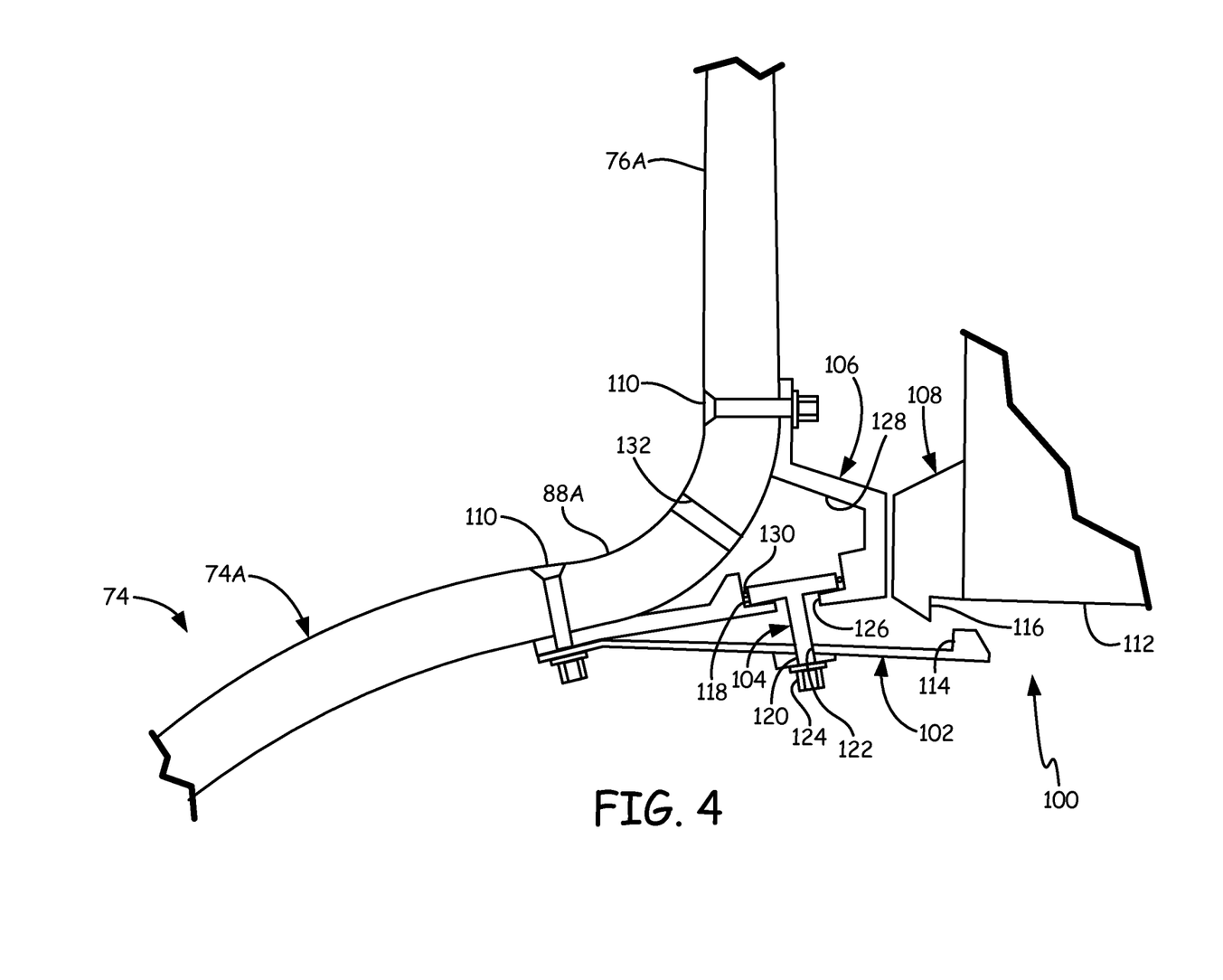
FIG. 4 is a schematic front sectional view of a first pressure actuated latch assembly.

FIG. 4 is a schematic front sectional view of latch assembly 100. Latch assembly 100 is a pressure actuated latch that functions to automatically latch in response to pressure. Latch assembly 100 includes latch 102, valve member 104, and bumpers 106 and 108. Latch 102 and bumper 106 are connected to core cowl corner 88A of core cowl side 74A via threaded fasteners 110. In an alternative embodiment, latch 102 and bumper 106 can be attached to portions of core cowl side 74A other than core cowl corner 88A. For example, bumper 106 could be attached near but not directly at core cowl corner 88A.

Bumper 108 is connected to pylon 112, which is a support structure for mounting gas turbine engine 20 (shown in FIG. 1) to an aircraft (not shown). In alternative embodiments, bumper 108 can be connected to another support structure other than pylon 112, such as core cowl corner 88B of core cowl side 74B (shown in FIG. 2). Bumper 108 is positioned adjacent and opposite bumper 106 such that bumper 106 can bump against bumper 108 when core cowl side 74A is closed over engine core 29 (shown in FIG. 1).

In the illustrated embodiment, latch 102 is flexible such that latch 102 can move between a latched position and an unlatched position. In an alternative embodiment, latch 102 can include a hinge and spring (not shown) allowing for latch 102 to move between the latched and unlatched positions. Latch 102 includes hook 114 and bumper 108 includes hook 116. Hook 114 is positioned at an end of latch 102, proximate hook 116 such that hook 114 can engage hook 116 in the latched position. As illustrated in FIG. 4, latch 102 is in the unlatched position, with hook 114 near but disengaged from hook 116. Latch 102 is in the latched position when hook 114 moves upward to engage hook 116.

Latch 102 is actuated via valve member 104. Valve member 104 includes valve disc 118 and shaft 120. Shaft 120 extends through hole 122 of latch 102 and is fastened by nut 124. Shaft 120 also extends through hole 126 in bumper 106 to valve disc 118. Bumper 106 is connected to core cowl side 74A to define cavity 128 between bumper 106 and core cowl side 74A. Valve disc 118 is positioned in cavity 128, adjacent and covering hole 126. Valve disc 118 can include seal 130 extending around a perimeter of valve disc 118. Hole 126 is a vent hole, allowing air inside core cowl 74 to flow through hole 126 to push valve disc 118 further into cavity 128. Hole 132 is another vent hole, extending through core cowl side 74A to allow air flow between cavity 128 and fan bypass duct 80 (shown in FIG. 2). Hook 114 is engaged with hook 116 when valve disc 118 is adjacent to hole 126, and hook 114 is disengaged from hook 116 when valve disc 118 is pushed away from hole 126.

When pressure increases inside core cowl 74 under burst conditions, that pressure pushes valve disc 118 outward, which pulls latch 102 up such that hook 114 engages hook 116. When latch 102 is in the latched position, latch 102 can reduce or prevent deflection by core cowl 74. This can reduce or prevent damage to core cowl 74 and/or other components of gas turbine engine 20 (shown in FIG. 1) as compared to a core cowl without latch assembly 100. Though FIG. 4 illustrates only a single latch assembly, multiple latch assemblies can be used at a top of core cowl 74. For example, an additional latch assembly 100 can be positioned at core cowl corner 88B (shown in FIG. 2) to latch core cowl side 74B to pylon 112 in the event of a burst condition.

In other alternative embodiments, latch assembly 100 can connect core cowl side 74A to a support structure other than core cowl side 74B or pylon 112. For example, one or more latch assemblies 100 can extend from the arc-shaped portion of core cowl side 74A to a portion of engine static structure 36 (shown in FIG. 1). Similarly, one or more latch assemblies 100 can also extend from the arc-shaped portion of core cowl side 74B to a portion of engine static structure 36.

Figure 5:
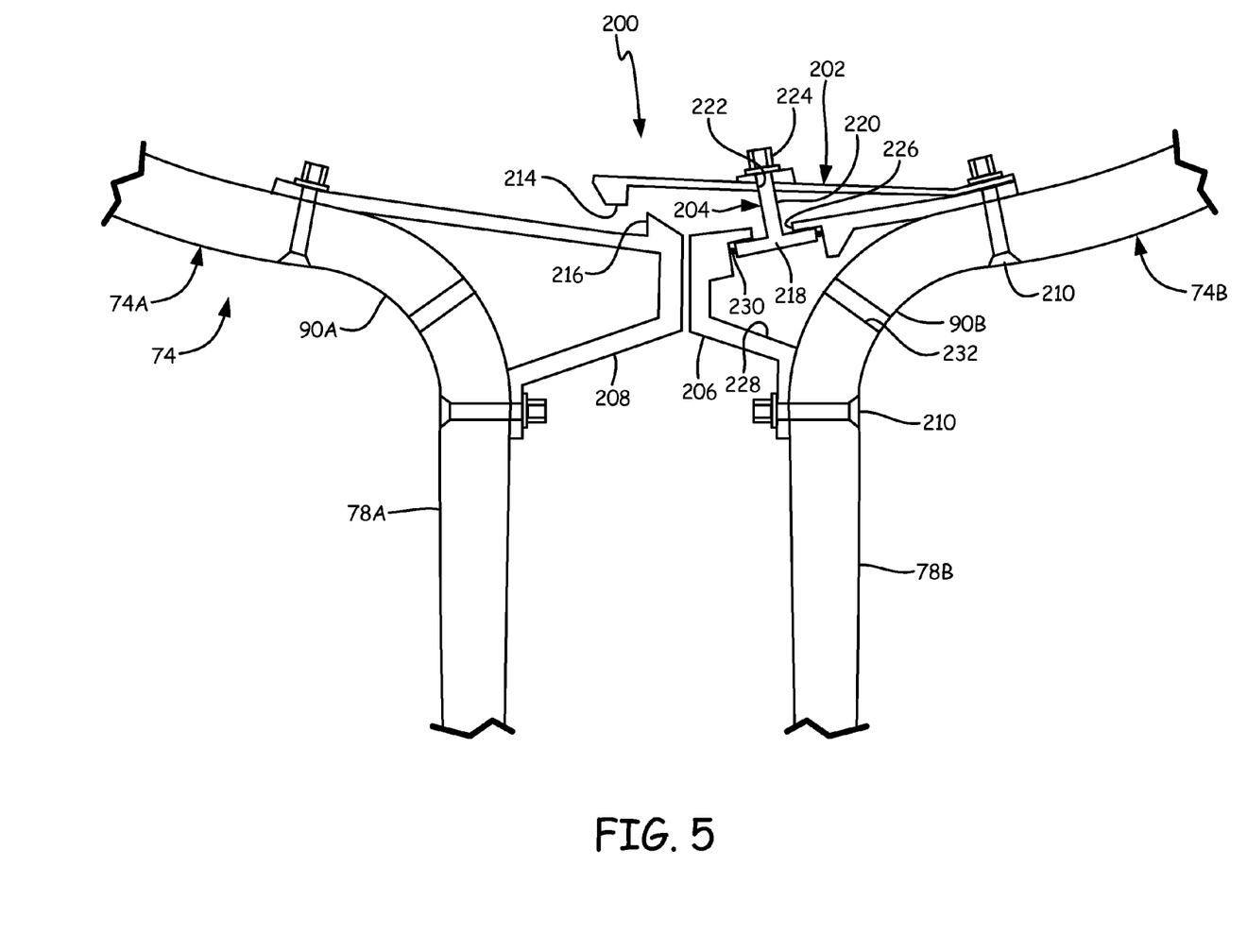
FIG. 5 is an schematic front sectional view of a second pressure actuated latch assembly.

FIG. 5 is a schematic front sectional view of latch assembly 200. Latch assembly 200 is similar to latch assembly 100, except that latch assembly 200 is configured for use at a bottom of core cowl 74. Latch assembly 200 is another pressure actuated latch that functions to automatically latch in response to pressure. Latch assembly 200 includes latch 202, valve member 204, and bumpers 206 and 208. Latch 202 and bumper 206 are connected to core cowl corner 90B of core cowl side 74B via threaded fasteners 210. Bumper 208 is connected to core cowl corner 90A of core cowl side 74A. Bumper 208 is positioned adjacent and opposite bumper 206 such that bumper 206 can bump against bumper 208 when core cowl sides 74A and 74B are closed over engine core 29 (shown in FIG. 1). In alternative embodiments, bumpers 206 and 208 can be attached to portions of core cowl 74 other than core cowl corners 90A and 90B. For example, bumpers 206 and 208 could be attached near but not directly at core cowl corners 90A and 90B, respectively.

Latch 202 is actuated via valve member 204 in a manner similar to that of valve member 104 (shown in FIG. 4). Valve member 204 includes valve disc 218 and shaft 220. Shaft 220 extends through hole 222 of latch 202 and is fastened by nut 224. Shaft 220 also extends through hole 226 in bumper 206 to valve disc 218. Bumper 206 is connected to core cowl side 74B to define cavity 228 between bumper 206 and core cowl side 74B. Valve disc 218 is positioned in cavity 228, adjacent and covering hole 226. Valve disc 218 can include seal 230 extending around a perimeter of valve disc 218. Hole 226 is a vent hole, allowing air inside core cowl 74 to flow through hole 226 to push valve disc 218 further into cavity 228. Hole 232 is another vent hole, extending through core cowl side 74B to allow air flow between cavity 228 and fan bypass duct 80 (shown in FIG. 2).

When pressure increases inside core cowl 74 under burst conditions, that pressure pushes valve disc 218 outward, which pulls latch 202 down such that hook 214 engages hook 216. When latch 202 is in the latched position, latch 202 can reduce or prevent deflection by core cowl 74. This can reduce or prevent damage to core cowl 74 and/or other components of gas turbine engine 20 (shown in FIG. 1) as compared to a core cowl without latch assembly 200.

Thus, latch assemblies 100 and 200 are actuable between an unlatched position when pressure within core cowl 74 is relatively low and a latched position when pressure within core cowl 74 is relatively high. This allows latch assemblies 100 and 200 to provide structural support to core cowl 74 under burst conditions. Because latch assembles 100 and 200 latch in response to pressure, maintenance personnel need not manually latch and unlatch latch assemblies 100 and 200 when core cowl 74 is opened and closed for maintenance of engine core 29. This can save maintenance personnel time and effort. The fact that latch assemblies 100 and 200 are automatically pressure actuated provides a safety function that does not rely on maintenance personnel remembering to use latch assemblies 100 and 200. By positioning latch assemblies 100 and 200 at core cowl corners 88A, 88B, 90A, and 90B, latch assemblies 100 and 200 can take advantage of the curved shape of core cowl sides 74A and 74B to provide hoop continuity and reduce or prevent deflection of all of core cowl 74. Including one or more latch assemblies 100 and 200 on core cowl 74 can be particularly beneficial in applications with especially low pressure in fan bypass duct 80, such as engines having a fan driven by gearing, such as fan 42 and geared architecture 48.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, one or more latch assemblies 100 and 200 need not be shaped and configured precisely as illustrated, but can be modified as suitable for a particular application.

Discussion of Possible Embodiments

The following are non-exclusive descriptions of possible embodiments of the present invention.

A gas turbine engine can include an engine core, a core cowl extending circumferentially around the engine core, and a pressure actuated latch assembly. The core cowl can include a first cowl section on a first side of the engine core and a second cowl section on a second side of the engine core. The pressure actuated latch assembly can connect the first cowl section to a support structure and be actuatable between an unlatched position when pressure within the core cowl is relatively low and a latched position when pressure within the core cowl is relatively high.

The gas turbine engine of the preceding paragraph can optionally include, additionally and/or alternatively any, one or more of the following features, configurations and/or additional components:

the pressure actuated latch assembly can include a latch having a first hook at a first end engagable with a second hook in the latched position;

the pressure actuated latch assembly can include a valve disc positioned adjacent a vent hole and a shaft extending through the vent hole to connect the valve disc to the latch, and the first hook can be disengaged from the second hook when the valve disc is adjacent to the vent hole and engaged with the second hook when the valve disc is pushed away from the vent hole;

the latch can be attached to the first cowl section at a second end of the latch;

the pressure actuated latch assembly can connect a corner of the first cowl section to a pylon in the latched position;

the pressure actuated latch assembly can connect a first corner of the first cowl section to a second corner of the second cowl section in the latched position;

the pressure actuated latch assembly can include a first bumper attached to the first cowl section and a second bumper attached to the support structure, such that the pressure actuated latch assembly connects the first bumper to the second bumper in the latched position;

the first bumper can be connected to the first cowl section to define a cavity between the first bumper and the first cowl section, a first vent hole can extend from the cavity through the first bumper, and a second vent hole can extend from the cavity through the first cowl section;

the first cowl section can include a curved portion and a substantially vertical portion connected to the curved portion at a corner, such that the pressure actuated latch assembly is attached to the first cowl section at the corner;

the first cowl section can include a curved portion, a first substantially vertical portion connected to a top of the curved portion at or near a first corner, and a second substantially vertical portion connected to a bottom of the curved portion at or near a second corner, such that the pressure actuated latch assembly is attached to the first cowl section at the first corner a second pressure actuated latch assembly is attached to the first cowl section at the second corner; and/or the support structure can be one of the second cowl section or a pylon.

A core cowl for use with an engine core of a gas turbine engine can include a first cowl section for covering a first side of an engine core and a second cowl section for covering a second side of the engine core. A pressure actuated latch assembly can connect the first cowl section to the second cowl section for latching the first cowl section to the second cowl section when pressure within the core cowl is relatively high.

the pressure actuated latch assembly can include a latch having a first hook at a first end engagable with a second hook in the latched position;

the pressure actuated latch assembly can include a valve disc positioned adjacent a vent hole and a shaft extending through the vent hole to connect the valve disc to the latch, such that the first hook is disengaged from the second hook when the valve disc is adjacent to the vent hole and the first hook is engaged with the second hook when the valve disc is pushed away from the vent hole;

the latch can be attached to the first cowl section at a second end of the latch;

the pressure actuated latch assembly can include a first bumper attached to a first corner of the first cowl section and a second bumper attached to a second corner of the second cowl section, such that the pressure actuated latch assembly connects the first bumper to the second bumper in the latched position;

the first bumper can be connected to the first cowl section to define a cavity between the first bumper and the first cowl section, a first vent hole can extend from the cavity through the first bumper, and a second vent hole can extend from the cavity through the first cowl section;

the pressure actuated latch assembly can connect a first corner of the first cowl section to a second corner of the second cowl section in the latched position;

the first cowl section can include a curved portion, a first substantially vertical portion connected to a top of the curved portion at the first corner, and a second substantially vertical portion connected to a bottom of the curved portion at a third corner; and/or a second pressure actuated latch assembly can connect a third corner of the first cowl section to a fourth corner of the second cowl section in the latched position.

The invention claimed is:

1. A gas turbine engine comprising:
an engine core;
a core cowl extending circumferentially around the engine core, the core cowl comprising:
a first cowl section on a first side of the engine core; and
a second cowl section on a second side of the engine core; and
a pressure actuated latch assembly connecting the first cowl section to a support structure and actuatable between an unlatched position when pressure within the core cowl is relatively low and a latched position when pressure within the core cowl is relatively high.

2. The gas turbine engine of claim 1, wherein the pressure actuated latch assembly comprises:
a latch having a first hook at a first end engagable with a second hook in the latched position.

3. The gas turbine engine of claim 2, wherein the pressure actuated latch assembly comprises:
a valve disc positioned adjacent a vent hole; and
a shaft extending through the vent hole to connect the valve disc to the latch, wherein the first hook is disengaged from the second hook when the valve disc is adjacent to the vent hole and the first hook is engaged with the second hook when the valve disc is pushed away from the vent hole.

4. The gas turbine engine of claim 2, wherein the latch is attached to the first cowl section at a second end of the latch.

5. The gas turbine engine of claim 1, wherein the pressure actuated latch assembly connects a corner of the first cowl section to a pylon in the latched position.

6. The gas turbine engine of claim 1, wherein the pressure actuated latch assembly connects a first corner of the first cowl section to a second corner of the second cowl section in the latched position.

7. The gas turbine engine of claim 1, wherein the pressure actuated latch assembly comprises:
a first bumper attached to the first cowl section; and
a second bumper attached to the support structure, wherein the pressure actuated latch assembly connects the first bumper to the second bumper in the latched position.

8. The gas turbine engine of claim 7, wherein the first bumper is connected to the first cowl section to define a cavity between the first bumper and the first cowl section, wherein a first vent hole extends from the cavity through the first bumper, and wherein a second vent hole extends from the cavity through the first cowl section.

9. The gas turbine engine of claim 1, wherein the first cowl section comprises:
a curved portion; and
a portion connected to the curved portion at a corner, wherein the portion is vertical when the first cowl section is in the unlatched position, and
wherein the pressure actuated latch assembly is attached to the first cowl section at the corner.

10. The gas turbine engine of claim 1, wherein the first cowl section comprises:
a curved portion;
a first portion connected to a top of the curved portion at or near a first corner, wherein the first portion is vertical when the first cowl section is in the unlatched position, and wherein the pressure actuated latch assembly is a first pressure actuated latch assembly attached to the first cowl section at the first corner; and
a second portion connected to a bottom of the curved portion at or near a second corner, wherein the second portion is vertical when the second cowl section is in the unlatched position, and wherein a second pressure actuated latch assembly is attached to the first cowl section at the second corner.

11. The gas turbine engine of claim 1, wherein the support structure is one of the second cowl section or a pylon.

12. A core cowl for use with an engine core of a gas turbine engine, the core cowl comprising:
a first cowl section for covering a first side of an engine core;
a second cowl section for covering a second side of the engine core; and
a pressure actuated latch assembly connecting the first cowl section to the second cowl section for latching the first cowl section to the second cowl section when pressure within the core cowl is relatively high, and for unlatching the first cowl section from the second cowl section when pressure within the core cowl is relatively low.

13. The core cowl of claim 12, wherein the pressure actuated latch assembly comprises:
a latch having a first hook at a first end engagable with a second hook in the latched position.

14. The core cowl of claim 13, wherein the pressure actuated latch assembly comprises:
a valve disc positioned adjacent a vent hole; and
a shaft extending through the vent hole to connect the valve disc to the latch,
wherein the first hook is disengaged from the second hook when the valve disc is adjacent to the vent hole and the first hook is engaged with the second hook when the valve disc is pushed away from the vent hole.

15. The core cowl of claim 13, wherein the latch is attached to the first cowl section at a second end of the latch.

16. The core cowl of claim 12, wherein the pressure actuated latch assembly comprises:
a first bumper attached to a first corner of the first cowl section; and
a second bumper attached to a second corner of the second cowl section,
wherein the pressure actuated latch assembly connects the first bumper to the second bumper in the latched position.

17. The core cowl of claim 16, wherein the first bumper is connected to the first cowl section to define a cavity between the first bumper and the first cowl section, wherein a first vent hole extends from the cavity through the first bumper, and wherein a second vent hole extends from the cavity through the first cowl section.

18. The core cowl of claim 12, wherein the pressure actuated latch assembly connects a first corner of the first cowl section to a second corner of the second cowl section in the latched position.

19. The core cowl of claim 18, wherein the first cowl section comprises:
a curved portion;
a first portion connected to a top of the curved portion at the first corner, wherein the first portion is vertical when the first cowl section is unlatched; and
a second portion connected to a bottom of the curved portion at a third corner, wherein the second portion is vertical when the second cowl section is unlatched.

20. The core cowl of claim 19, wherein the pressure actuated latch assembly is a first pressure actuated latch assembly, the core cowl further comprising:

a second pressure actuated latch assembly that connects the third corner of the first cowl section to a fourth corner of the second cowl section in the latched position.

\* \* \* \* \*